(12) United States Patent
Lee et al.

(10) Patent No.: US 9,880,570 B2
(45) Date of Patent: Jan. 30, 2018

(54) METHOD AND DEVICE FOR GENERATING VIBRATION BASED ON AN ADJECTIVE

(71) Applicants: Samsung Electronics Co., Ltd., Suwon-si, Gyeonggi-do (KR); Postech Academy-Industry-Foundation, Pohang-si, Gyeongsangbuk-do (KR)

(72) Inventors: Eun-hwa Lee, Suwon-si (KR); Seung-moon Choi, Pohang-si (KR); Jae-bong Lee, Pohang-si (KR); Jeong-seok Lee, Anyang-si (KR); Dae-kwang Jung, Suwon-si (KR); Yu-dong Bae, Suwon-si (KR); Jong-man Seo, Daegu (KR); Yong-jae Yoo, Pohang-si (KR); Jae-min Chun, Daegu (KR)

(73) Assignees: Samsung Electronics Co., Ltd., Suwon-si (KR); Postech Academy Industry Foundation, Pohang-si (KR)

( * ) Notice: Subject to any disclaimer, the term of this patent is extended or adjusted under 35 U.S.C. 154(b) by 410 days.

(21) Appl. No.: 14/606,456

(22) Filed: Jan. 27, 2015

(65) Prior Publication Data
US 2015/0212527 A1    Jul. 30, 2015

(30) Foreign Application Priority Data

Jan. 28, 2014    (KR) .......................... 10-2014-0010881

(51) Int. Cl.
*G05B 21/00*    (2006.01)
*G05B 13/00*    (2006.01)
(Continued)

(52) U.S. Cl.
CPC ............. *G05D 19/02* (2013.01); *G05B 15/02* (2013.01); *G06F 3/016* (2013.01); *G06F 3/0488* (2013.01)

(58) Field of Classification Search
CPC ........ G05D 19/02; G05D 15/02; G06F 3/016; G06F 3/0488
(Continued)

(56) References Cited

U.S. PATENT DOCUMENTS

| 7,999,166 B2 | 8/2011 | Choi et al. |
| 2010/0127581 A1* | 5/2010 | Yun ........................ H02K 33/16 310/25 |

(Continued)

FOREIGN PATENT DOCUMENTS

| KR | 10-0807738 B1 | 2/2008 |
| KR | 10-2010-0125219 A | 11/2010 |

(Continued)

*Primary Examiner* — Mohammad Ali
*Assistant Examiner* — MD Azad
(74) *Attorney, Agent, or Firm* — Jefferson IP Law, LLP

(57) ABSTRACT

A method for generating a vibration by a device by using an adjective is provided. The method includes setting at least one fundamental frequency and at least one overlap ratio corresponding to a certain adjective and a degree value of the certain adjective, receiving at least one user input for inputting an adjective and a degree value of the input adjective, and generating at least one vibration corresponding to the input adjective and the degree value of the input adjective based on the setting. The generated at least one vibration has a fundamental frequency and an overlap ratio corresponding to the input adjective and the degree value of the input adjective.

15 Claims, 12 Drawing Sheets

(51) Int. Cl.
*G05B 15/00* (2006.01)
*G05D 23/00* (2006.01)
*G01M 1/38* (2006.01)
*G05D 19/02* (2006.01)
*G06F 3/0488* (2013.01)
*G06F 3/01* (2006.01)
*G05B 15/02* (2006.01)

(58) Field of Classification Search
USPC .......................................................... 700/280
See application file for complete search history.

(56) References Cited

U.S. PATENT DOCUMENTS

| | | | |
|---|---|---|---|
| 2010/0148944 A1* | 6/2010 | Kim | G06F 3/016 340/407.1 |
| 2010/0164697 A1* | 7/2010 | Kang | H04M 19/04 340/407.1 |
| 2010/0238116 A1* | 9/2010 | Shin | G06F 3/016 345/168 |
| 2011/0048213 A1 | 3/2011 | Choi et al. | |
| 2013/0307809 A1 | 11/2013 | Sudou | |
| 2015/0253850 A1* | 9/2015 | Behles | G06F 3/0488 715/702 |

FOREIGN PATENT DOCUMENTS

| | | |
|---|---|---|
| KR | 10-2010-0125804 A | 12/2010 |
| KR | 10-2011-0076283 A | 7/2011 |

\* cited by examiner

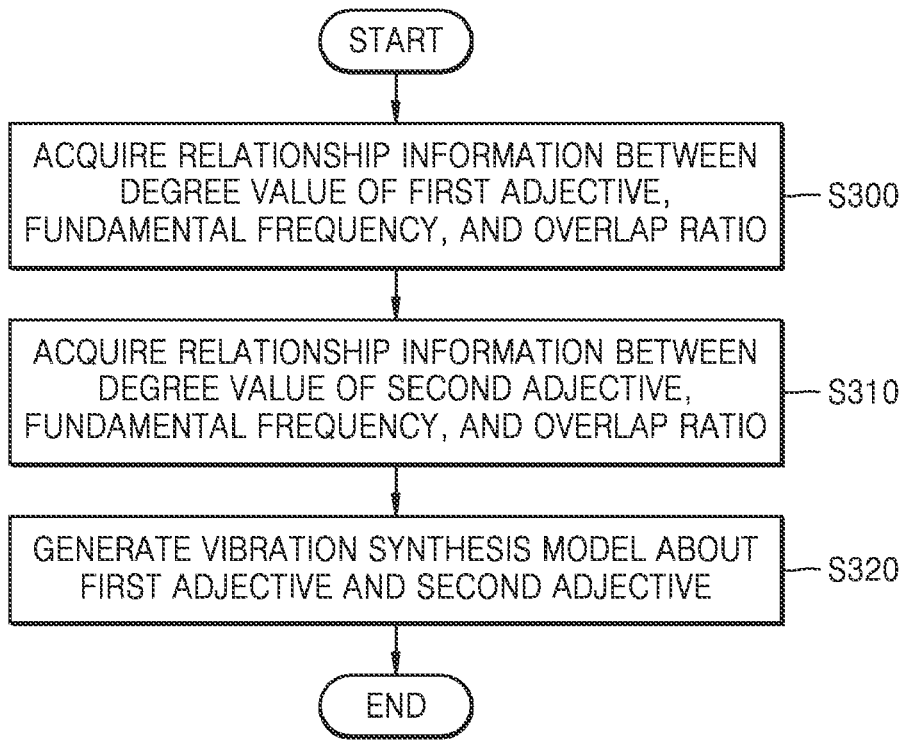
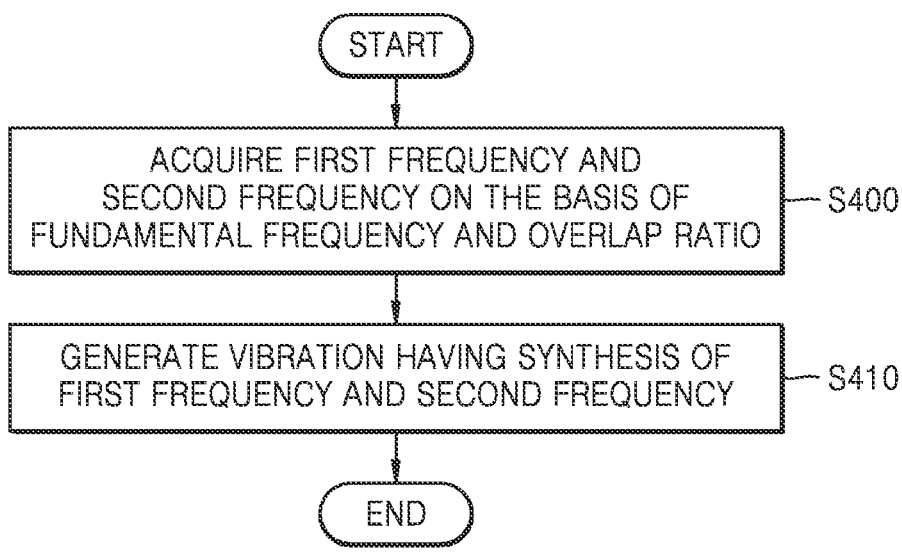

METHOD AND DEVICE FOR GENERATING VIBRATION BASED ON AN ADJECTIVE

CROSS-REFERENCE TO RELATED APPLICATION(S)

This application claims the benefit under 35 U.S.C. § 119(a) of a Korean patent application filed on Jan. 28, 2014 in the Korean Intellectual Property Office and assigned Serial number 10-2014-0010881, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. 2) Postech Academy Industry Foundation.

TECHNICAL FIELD

The present disclosure relates to methods and devices for generating a vibration by using a degree value of an adjective.

BACKGROUND

Among various types of haptic feedback, vibration-based haptic feedback (hereinafter referred to as "vibration feedback") are widely used in various mobile devices, such as smart phones and tablet devices, game consoles, and realistic four-dimensional (4D) movie theaters. Also, since vibration feedback is more efficient than other types of feedback, the use of vibration feedback is on the increase currently.

However, in the related art, a method of directly setting a frequency and an amplitude, which are physical properties of a vibration waveform, is mainly used to generate a vibration feedback. Accordingly, it is difficult for an inexpert user to receive a vibration of his desired sense from a device, and it is also difficult to predict and quantify a perceptive sense that a user feels through a vibration.

Therefore, required is vibration generation technology that allows a user to accurately receive a vibration of his desired sense from a device and may easily predict and quantify perceptive properties of a vibration.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and devices for generating a vibration by using an adjective, which may generate a vibration having a fundamental frequency and an overlap ratio corresponding to an adjective and a degree value of the adjective.

Another aspect of the present disclosure is to provide methods and devices for generating a vibration by using an adjective, which may generate a vibration by using a fundamental frequency and an overlap ratio determined on the basis of a degree value of a first adjective and a degree value of a second adjective.

Another aspect of the present disclosure is to provide methods and devices for generating a vibration by using an adjective, which may modulate an amplitude of a vibration by using a degree value of a perceiving intensity.

Additional aspects will be set forth in part in the description which follows and, in part, will be apparent from the description, or may be learned by practice of the presented embodiments of the present disclosure.

In accordance with an aspect of the present disclosure, a method for generating a vibration by a device by using an adjective is provided. The method includes setting at least one fundamental frequency and at least one overlap ratio corresponding to a certain adjective and a degree value of the certain adjective, receiving at least one user input for inputting an adjective and a degree value of the input adjective, and generating at least one vibration corresponding to the input adjective and the degree value of the input adjective based on the setting. The generated at least one vibration has a fundamental frequency and an overlap ratio corresponding to the input adjective and the degree value of the input adjective.

In accordance with another aspect of the present disclosure, a device for generating a vibration by using an adjective is provided. The device includes a control unit configured to set at least one fundamental frequency and at least one overlap ratio corresponding to a certain adjective and a degree value of the certain adjective, a user input unit configured to receive at least one user input for inputting an adjective and a degree value of the input adjective, and a vibration generating unit configured to generate at least one vibration corresponding to the input adjective and the degree value of the input adjective based on the setting. The generated at least one vibration has a fundamental frequency and an overlap ratio corresponding to the input adjective and the degree value of the input adjective.

In accordance with another aspect of the present disclosure, a non-transitory computer-readable recording medium is provided. The non-transitory computer-readable recording medium stores one or more programs including instructions that, when executed by a computer, cause the computer to perform a method for generating a vibration by a device by using an adjective, the method including setting at least one fundamental frequency and at least one overlap ratio corresponding to a certain adjective and a degree value of the certain adjective, receiving at least one user input for inputting an adjective and a degree value of the input adjective, and generating at least one vibration corresponding to the input adjective and the degree value of the input adjective based on the setting. The generated at least one vibration has a fundamental frequency and an overlap ratio corresponding to the input adjective and the degree value of the input adjective.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 is a flowchart of a method for generating a vibration synthesis model by a device according to various embodiments of the present disclosure;

FIG. 5 is a flowchart of a method for generating a first vibration and a second vibration by a device based on a fundamental frequency and an overlap ratio according to various embodiments of the present disclosure;

Throughout the drawings, it should be noted that like reference numbers are used to depict the same or similar elements, features, and structures.

DETAILED DESCRIPTION

Figure 1:
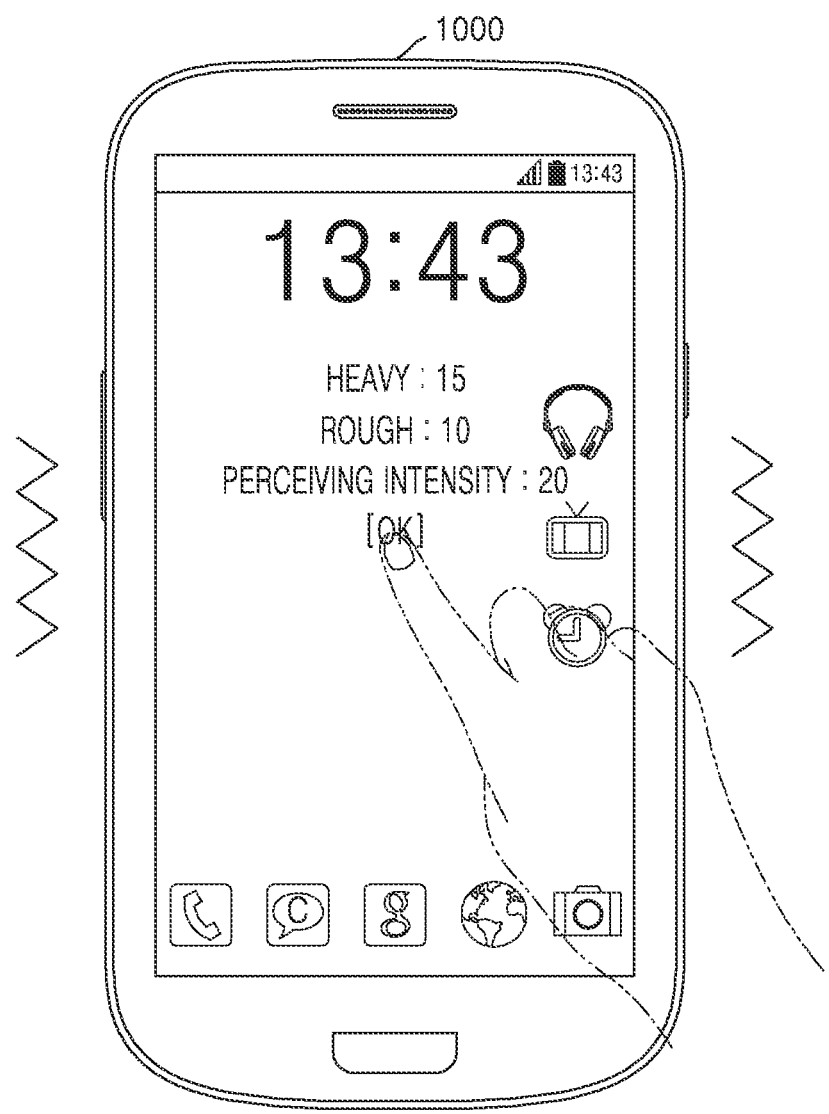
FIG. 1 is a diagram illustrating a device for generating a vibration based on a degree value of an adjective according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when an element is referred to as being "connected" to another element, it may be "directly connected" to the other element or may be "electrically connected" to the other element with other element(s) interposed therebetween. It will also be understood that the terms "comprises", "includes", and "has", when used herein, specify the presence of stated elements, but do not preclude the presence or addition of other elements, unless otherwise defined.

Also, in the specification, an adjective may refer to a word representing a sense that a user may feel through a vibration of a device, and the device may generate the vibration by using a degree value of the adjective. The senses felt by the user may include, for example, "heavy", "light", "rough", and "smooth", but is not limited thereto.

Also, in the specification, the degree value of the adjective may refer to a value representing the degree of the senses felt by the user through the vibration of the device. For example, when the degree value of "heavy" is great, the device may generate a vibration through which the user may strongly feel a "heavy" sense.

Also, in the specification, a perceiving intensity may refer to an intensity at which the user perceives a vibration. For example, when a degree value of the perceiving intensity is great, the device may generate a vibration so that the user may intensely feel the vibration.

Also, in the specification, a fundamental frequency and an overlap ratio may be defined by two frequencies. The fundamental frequency may be the smaller one of a first frequency and a second frequency, and the overlap ratio may be a value obtained by dividing the greater one of the first frequency and the second frequency by the fundamental frequency. However, various embodiments of the present disclosure are not limited thereto.

Hereinafter, various embodiments of the present disclosure will be described in detail with reference to the accompanying drawings.

FIG. 1 is a diagram illustrating a device for generating a vibration based on a degree value of an adjective according to various embodiments of the present disclosure.

Referring to FIG. 1, a device 1000 may generate a predetermined vibration according to a degree value of an adjective. The device 1000 may determine a degree value of an adjective and determine a frequency of a vibration based on the determined degree value of the adjective. Also, the device 1000 may generate a vibration having the determined frequency. In this case, the degree value of the adjective may be input to the device 1000 by the user; however, various embodiments of the present disclosure are not limited thereto. Also, the device 1000 may generate a vibration having a plurality of frequencies by determining a fundamental frequency and an overlap ratio corresponding to an adjective and a degree value of the adjective.

Also, the device 1000 may generate at least one vibration for a plurality of adjectives by using a vibration synthesis model that will be described later. In this case, the device 1000 may generate a vibration synthesis model for a plurality of adjectives and determine a first frequency and a second frequency for generating a vibration by using the generated vibration synthesis model.

Also, the device 1000 may modulate an amplitude of a vibration according to a degree value of perceiving intensity. In this case, the degree value of the perceiving intensity may be input to the device 1000 by the user; however, various embodiments of the present disclosure are not limited thereto.

Accordingly, the user may select a degree value of the displayed adjective and determine a degree value of the perceiving intensity, thereby making it possible for the device 1000 to generate a vibration of a sense and an intensity desired by the user.

Also, the device 1000 may be, for example, a smart phone, a smart television (TV), a mobile phone, a personal digital assistant (PDA), a laptop computer, a media player, a micro server, a global positioning system (GPS) device, an e-book terminal, a digital broadcasting terminal, a navigation device, a kiosk, a Motion Picture Experts Group (MPEG-1 or MPEG-2) Audio Layer III (MP3) player, a digital camera, or any other mobile or immobile computing device. However, various embodiments of the present disclosure are not limited thereto, and the device 1000 may include any other device that may generate a vibration feedback.

Figure 2:
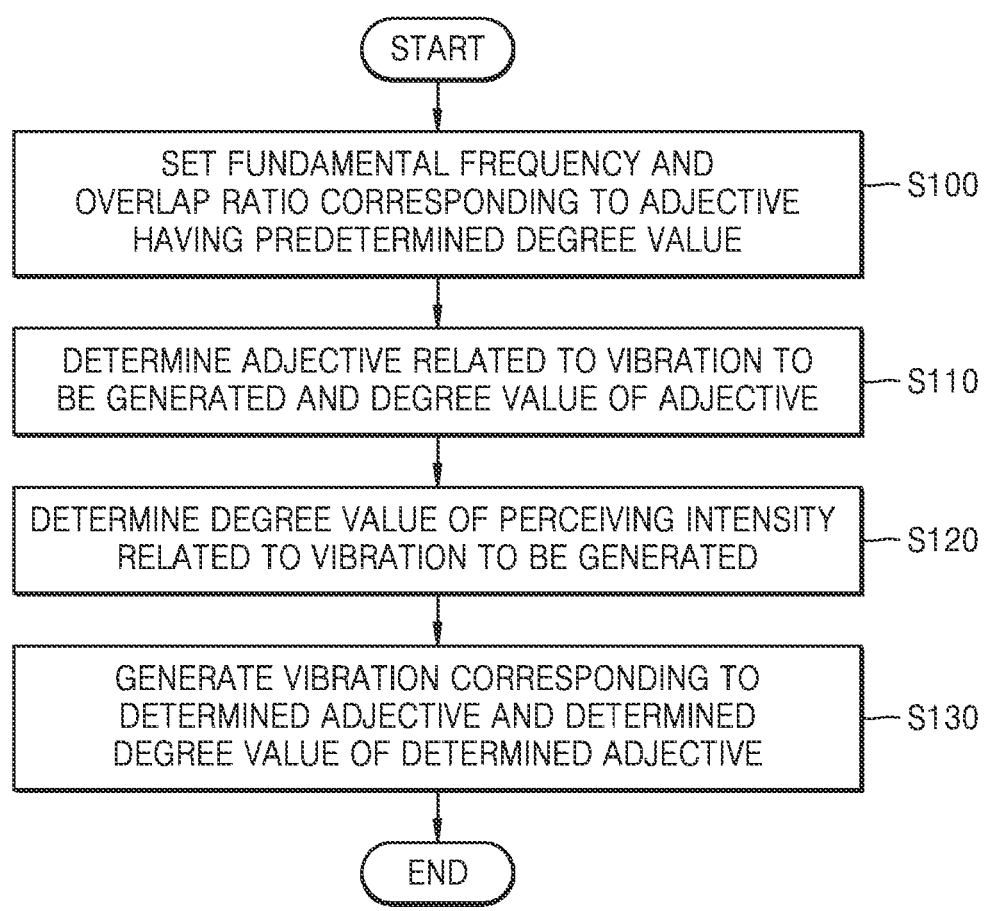
FIG. 2 is a flowchart of a method for generating a vibration by a device based on a degree value of an adjective according to various embodiments of the present disclosure.

FIG. 2 is a flowchart of a method for generating a vibration by a device based on a degree value of an adjective according to various embodiments of the present disclosure.

Referring to FIG. 2, in operation S100, the device 1000 may set at least one fundamental frequency and at least one overlap ratio corresponding to an adjective having a predetermined degree value. For example, the device 1000 may set a fundamental frequency and an overlap ratio corresponding to an adjective and a degree value of the adjective. Also, for example, the device 1000 may set a fundamental frequency and an overlap ratio corresponding to an adjective and a degree value of the adjective. Also, for example, the device 1000 may set a fundamental frequency and an overlap ratio corresponding to a plurality of adjectives and degree values of the adjectives. Also, for example, the device 1000 may set a plurality of fundamental frequencies and a plurality of overlap ratios corresponding to a plurality of adjectives and degree values of the adjectives. Accordingly, the device 1000 may effectively synthesize various frequencies to embody an adjective having a predetermined degree value as a vibration.

Also, the fundamental frequency and the overlap ratio corresponding to the adjective and the degree value of the adjective may be experimentally determined. For example, a fundamental frequency and an overlap ratio may be experimentally determined to generate a vibration of a "rough" sense having a degree value "10".

Also, the device 1000 may set an amplitude variation value of a vibration corresponding to an adjective having a predetermined degree value. For example, a variation value of a vibration may be experimentally determined to generate a vibration of a "rough" sense having a degree value "10". In this case, the variation value of the vibration may be experimentally determined in association with the fundamental frequency and the overlap ratio. Also, the device 1000 may set the experimentally-determined variation value of the vibration as a variation value of a vibration corresponding to an adjective having a predetermined degree value.

In operation S110, the device 1000 may determine an adjective related to a vibration to be generated and a degree value of the adjective. The device 1000 may determine an adjective related to a vibration to be generated and a degree value of the adjective by receiving at least one user input for inputting an adjective and a degree value of the adjective. For example, the device 1000 may display a predetermined user interface for inputting the adjective related to the vibration to be generated and the degree value of the adjective, and determine the adjective and the degree value of the adjective based on the user input to the displayed user interface.

In operation S120, the device 1000 may determine a degree value of a perceiving intensity related to the vibration to be generated. The device 1000 may determine a degree value of a perceiving intensity related to the vibration to be generated by receiving at least one user input for inputting a degree value of a perceiving intensity. For example, the device 1000 may display a predetermined user interface for inputting the degree value of the perceiving intensity related to the vibration to be generated on a screen of the device 1000, and determine the degree value of the perceiving intensity based on the user input to the displayed user interface.

In operation S130, the device 1000 may generate at least one vibration corresponding to the determined adjective and the determined degree value of determined adjective. The device 1000 may determine the fundamental frequency and the overlap ratio corresponding to the adjective and the degree value of the adjective input by the user based on the values set in operation S100, and generate a vibration having the determined fundamental frequency and the determined overlap ratio.

Also, the device 1000 may determine an amplitude variation value of the vibration having the determined fundamental frequency and the determined overlap ratio based on the values set in operation S100, and generate a vibration based on the determined amplitude variation value.

Also, the device 1000 may modulate an amplitude of the vibration to be generated, based on the determined degree value of the perceiving intensity. In this case, the device 1000 may modulate the amplitude of the vibration to be generated based on all of the determined adjectives, the determined degree value of the determined adjective, and the determined degree value of the perceiving intensity.

Figure 3:
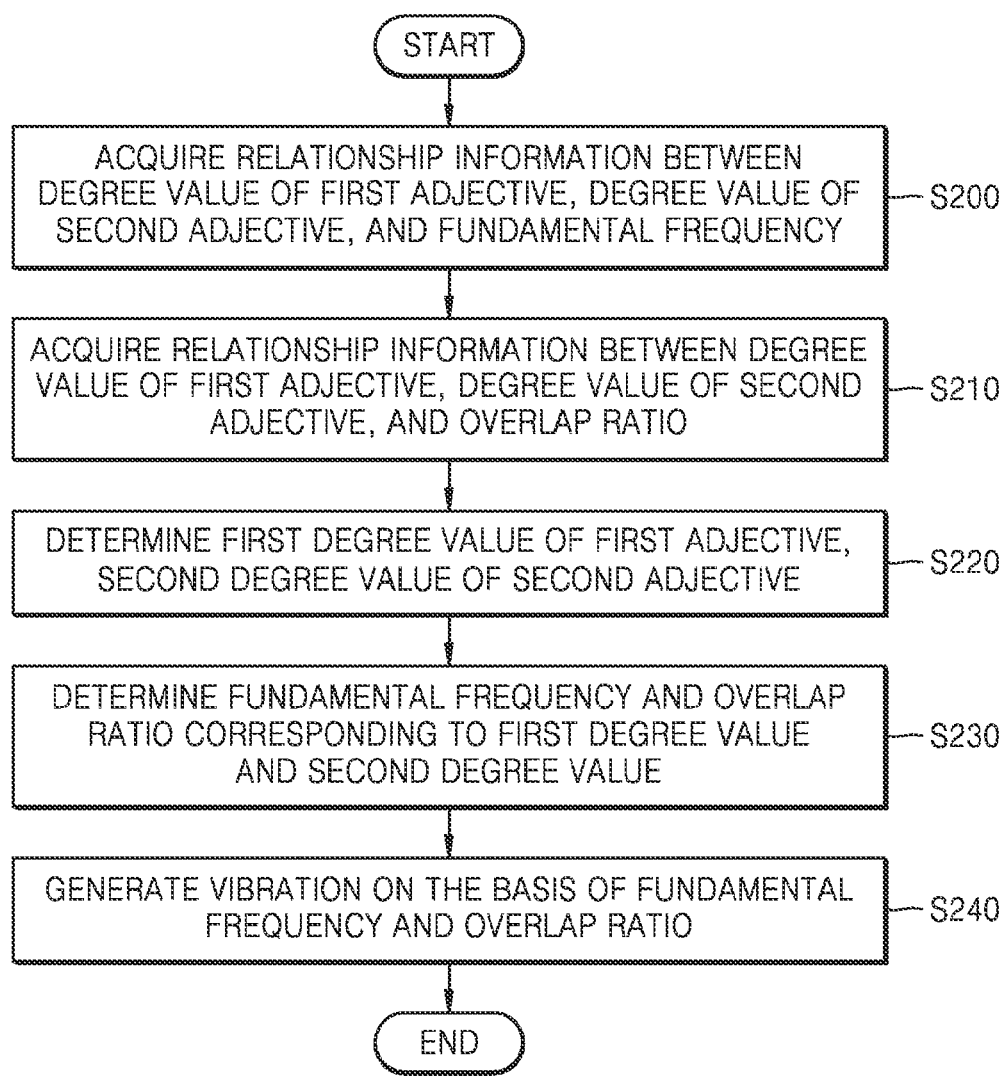
FIG. 3 is a flowchart of a method for generating a vibration by a device based on a degree value of a first adjective and a degree value of a second adjective according to various embodiments of the present disclosure.

FIG. 3 is a flowchart of a method for generating a vibration by a device based on a degree value of a first adjective and a degree value of a second adjective according to various embodiments of the present disclosure. As an example, FIG. 3 illustrates a method for generating a vibration having senses of two adjectives by synthesizing two frequencies.

Figure 8:
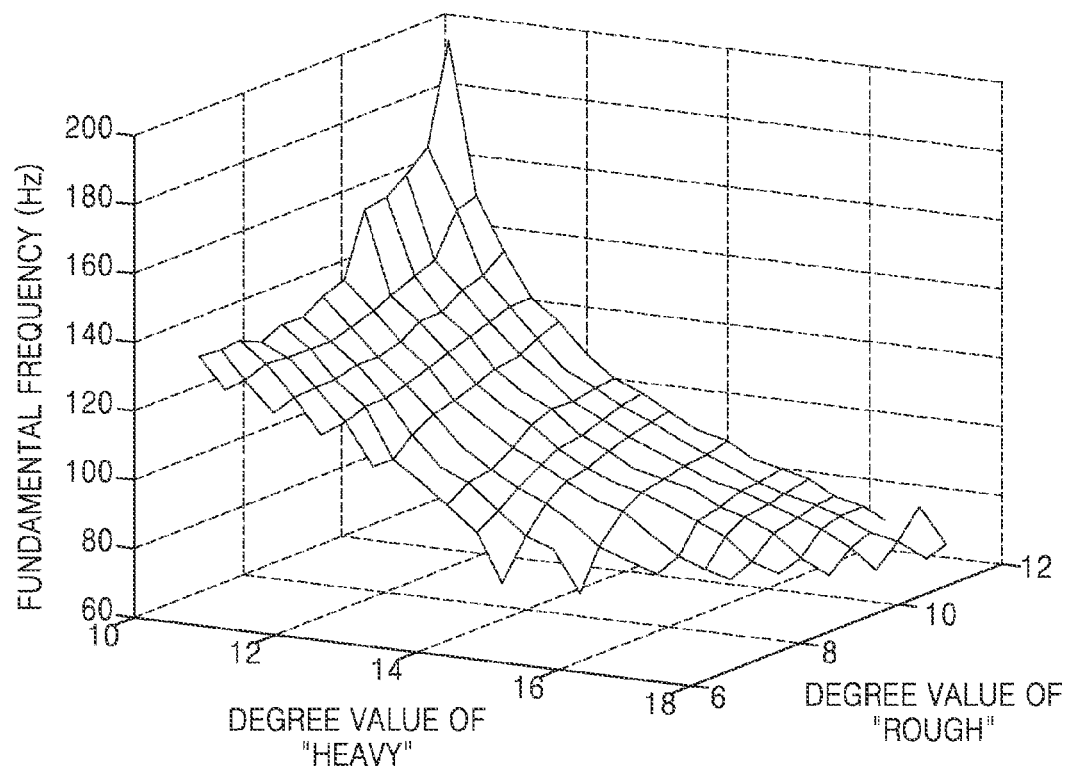
FIG. 8 is a graph representing a fundamental frequency value versus a degree value of a first adjective and a degree value of a second adjective according to various embodiments of the present disclosure.

Referring to FIG. 3, in operation S200, the device 1000 acquires relationship information between a degree value of the first adjective, a degree value of the second adjective, and the fundamental frequency. The device 1000 may receive the relationship information between the degree value of the first adjective, the degree value of the second adjective, and the fundamental frequency from an external device (not illustrated) or may directly generate the relationship information. Also, the relationship information between the degree value of the first adjective, the degree value of the second adjective, and the fundamental frequency may be a graph representing a fundamental frequency value versus the degree value of the first adjective and the degree value of the second adjective. For example, the relationship information between the degree value of the first adjective, the degree value of the second adjective, and the fundamental frequency may be a graph representing a fundamental frequency value versus a degree value of an adjective "heavy" and a degree value of an adjective "rough" as illustrated in FIG. 8.

Also, the graph representing the fundamental frequency value versus the degree value of the first adjective and the degree value of the second adjective may be generated by using a graph representing the degree value of the first adjective versus the fundamental frequency and the overlap ratio and a graph representing the degree value of the second adjective versus the fundamental frequency and the overlap ratio. For example, a graph of FIG. 8 may be generated by synthesizing graphs of FIGS. 6 and 7.

In operation S210, the device 1000 acquires relationship information between the degree value of the first adjective, the degree value of the second adjective, and the overlap ratio. The device 1000 may receive the relationship information between the degree value of the first adjective, the degree value of the second adjective, and the overlap ratio from an external device (not illustrated) or may directly generate the relationship information. Also, the relationship information between the degree value of the first adjective, the degree value of the second adjective, and the overlap ratio may be a graph representing an overlap ratio value versus the degree value of the first adjective and the degree value of the second adjective. For example, the relationship information between the degree value of the first adjective, the degree value of the second adjective, and the overlap ratio may be a graph representing an overlap ratio value versus a degree value of an adjective "heavy" and a degree value of an adjective "rough" as illustrated in FIG. 8.

Also, the graph representing the overlap ratio value versus the degree value of the first adjective and the degree value of the second adjective may be generated by using a graph representing the degree value of the first adjective versus the fundamental frequency and the overlap ratio and a graph representing the degree value of the second adjective versus the fundamental frequency and the overlap ratio. For example, a graph of FIG. 9 may be generated by synthesizing the graphs of FIGS. 6 and 7.

In operation S220, the device 1000 determines a first degree value of the first adjective and a second degree value of the second adjective. The device 1000 may determine the first degree value of the first adjective and the second degree value of the second adjective based on the user input. In this case, the device 1000 may display a user interface for setting a degree value of an adjective on a screen of the device 1000. Also, the device 1000 may determine the first degree value of the first adjective and the second degree value of the second adjective according to a user input to the displayed user interface. For example, the first adjective may be "heavy", and the second adjective may be "rough". In this case, based on the user input, the device 1000 may determine the first degree value of the first adjective "heavy" as "15" and determine the second degree value of the second adjective "rough" as "10".

Also, the first degree value of the first adjective and the second degree value of the second adjective determined in operation S220 may be used by the device 1000 to generate a vibration of a sense corresponding to the first adjective and the second adjective.

In operation S230, the device 1000 determines a fundamental frequency and an overlap ratio corresponding to the first degree value and the second degree value. The device 1000 may determine the fundamental frequency corresponding to the first degree value and the second degree value based on the relationship information between the degree value of the first adjective, the degree value of the second adjective, and the fundamental frequency acquired in operation S200. For example, the device 1000 may acquire the fundamental frequency corresponding to the first degree value and the second degree value by inputting the first degree value and the second degree value determined in operation S220 to the graph representing the fundamental frequency value versus the degree value of the first adjective and the degree value of the second adjective.

Also, the device 1000 may determine the overlap ratio corresponding to the first degree value and the second degree value based on the relationship information between the degree value of the first adjective, the degree value of the second adjective, and the overlap ratio acquired in operation 210. For example, the device 1000 may acquire the overlap ratio corresponding to the first degree value and the second degree value by inputting the first degree value and the second degree value determined in operation S220 to the graph representing the overlap ratio value versus the degree value of the first adjective and the degree value of the second adjective.

In operation S240, the device 1000 generates a vibration based on the fundamental frequency and the overlap ratio determined in operation S230. The device 1000 may determine a first frequency and a second based on the relationship of the first frequency and the second frequency to the fundamental frequency and the overlap ratio. A method for determining the first frequency and the second frequency by the device 1000 will be described in more detail in operation S400.

Also, the device 1000 may generate a vibration having the first frequency and the second frequency. The device 1000 may generate the vibration having the first frequency and the second frequency by synthesizing the first frequency and the second frequency. Also, the device 1000 may generate a first vibration having the first frequency and a second vibration having the second frequency. However, various embodiments of the present disclosure are not limited thereto.

Although FIG. 3 illustrates a method for generating a vibration for two adjectives, various embodiments of the present disclosure are not limited thereto. That is, the device 1000 may also generate a vibration having a sense of one adjective or a vibration having senses of three or more adjectives.

Although FIG. 3 illustrates a method for generating a vibration by synthesizing two frequencies, various embodiments of the present disclosure are not limited thereto. That is, the device 1000 may also generate a vibration by synthesizing three or more frequencies. In this case, the relationship between the fundamental frequency, the overlap ratio, and three or more frequencies may be set differently from FIG. 3. Also, the relationship between the adjectives and three or more frequencies may be experimentally set differently from FIG. 3.

Also, although FIG. 3 illustrates that the device 1000 generates one vibration, various embodiments of the present disclosure are not limited thereto. That is, the device 1000 may also generate a plurality of vibrations. In this case, each of the vibrations may have one or more frequencies.

FIG. 4 is a flowchart of a method for generating a vibration synthesis model by a device according to various embodiments of the present disclosure.

Referring to FIG. 4, in order to generate the vibration synthesis model, the device 1000 generates relationship information between the degree value of the first adjective, the degree value of the second adjective, and the fundamental frequency and relationship information between the degree value of the first adjective, the degree value of the second adjective, and the overlap ratio.

In operation S300, the device 1000 acquires relationship information between the degree value of the first adjective, the fundamental frequency, and the overlap ratio. The device 1000 may acquire a graph representing the degree value of the first adjective versus the fundamental frequency and the overlap ratio.

Also, the graph representing the degree value of the first adjective versus the fundamental frequency and the overlap ratio may be generated by perceptive experiments. For example, the graph representing the degree value of the first adjective versus the fundamental frequency and the overlap ratio may be generated by experimentally measuring the degree of the sense of the first adjective for the physical property of the vibration.

In operation S310, the device 1000 acquires relationship information between the degree value of the second adjective, the fundamental frequency, and the overlap ratio. The device 1000 may acquire a graph representing the degree value of the second adjective versus the fundamental frequency and the overlap ratio.

Also, the graph representing the degree value of the second adjective versus the fundamental frequency and the overlap ratio may be generated by perceptive experiments. For example, the graph representing the degree value of the second adjective versus the fundamental frequency and the overlap ratio may be generated by experimentally measuring the degree of the sense of the second adjective for the physical property of the vibration.

In operation S320, the device 1000 generates a vibration synthesis model for the first adjective and the second adjective. The device 1000 may generate relationship information between the degree value of the first adjective, the degree value of the second adjective, and the fundamental frequency and relationship information between the degree value of the first adjective, the degree value of the second adjective, and the overlap ratio by synthesizing the relationship information acquired in operation S300 and the relationship information acquired in operation S310.

For example, the device 1000 may generate a graph representing the fundamental frequency value versus the degree value of the first adjective and the degree value of the second adjective by using a graph representing the degree value of the first adjective versus the fundamental frequency and the overlap ratio and a graph representing the degree value of the second adjective versus the fundamental frequency and the overlap ratio. For example, the device 1000 may generate the graph of FIG. 8 by synthesizing the graphs of FIGS. 6 and 7.

Also, for example, the device 1000 may generate a graph representing the overlap ratio value versus the degree value of the first adjective and the degree value of the second adjective by using a graph representing the degree value of the first adjective versus the fundamental frequency and the overlap ratio and a graph representing the degree value of the second adjective versus the fundamental frequency and the overlap ratio. For example, the device 1000 may generate the graph of FIG. 9 by synthesizing the graphs of FIGS. 6 and 7.

Although FIG. 4 illustrates that the device 1000 generates the relationship information between the degree value of the first adjective, the fundamental frequency, and the overlap ratio, the relationship information between the degree value of the second adjective, the fundamental frequency, and the overlap ratio, and the vibration synthesis model for the first adjective and the second adjective, various embodiments of the present disclosure are not limited thereto. The device 1000 may also receive the relationship information between the degree value of the first adjective, the fundamental frequency, and the overlap ratio, the relationship information between the degree value of the second adjective, the fundamental frequency, and the overlap ratio, and the vibration synthesis model for the first adjective and the second adjective, which are generated or acquired by an external device (not illustrated), from the external device (not illustrated).

FIG. 5 is a flowchart of a method for generating a first vibration and a second vibration by device based on a fundamental frequency and an overlap ratio according to various embodiments of the present disclosure.

Referring to FIG. 5, in operation S400, the device 1000 acquires the first frequency and the second frequency based on the fundamental frequency and the overlap ratio. The device 1000 may acquire the first frequency and the second frequency by inputting the fundamental frequency and the overlap ratio to Equations 1 and 2 below.

$$\text{Fundamental Frequency} = \min(\text{First Frequency, Second Frequency}) \quad \text{Equation 1}$$

$$\text{Overlap Ratio} = \max(\text{First Frequency, Second Frequency}) / \min(\text{First Frequency, Second Frequency}) \quad \text{Equation 2}$$

In operation S410, the device 1000 generates a vibration having a synthesis of the first frequency and the second frequency.

Also, the device 1000 may generate a vibration based on the perceiving intensity. The device 1000 may synthesize a first amplitude for the first frequency and a second amplitude for the second frequency based on the perceiving intensity, which will be described later in detail with reference to FIG. 10.

Figure 6:
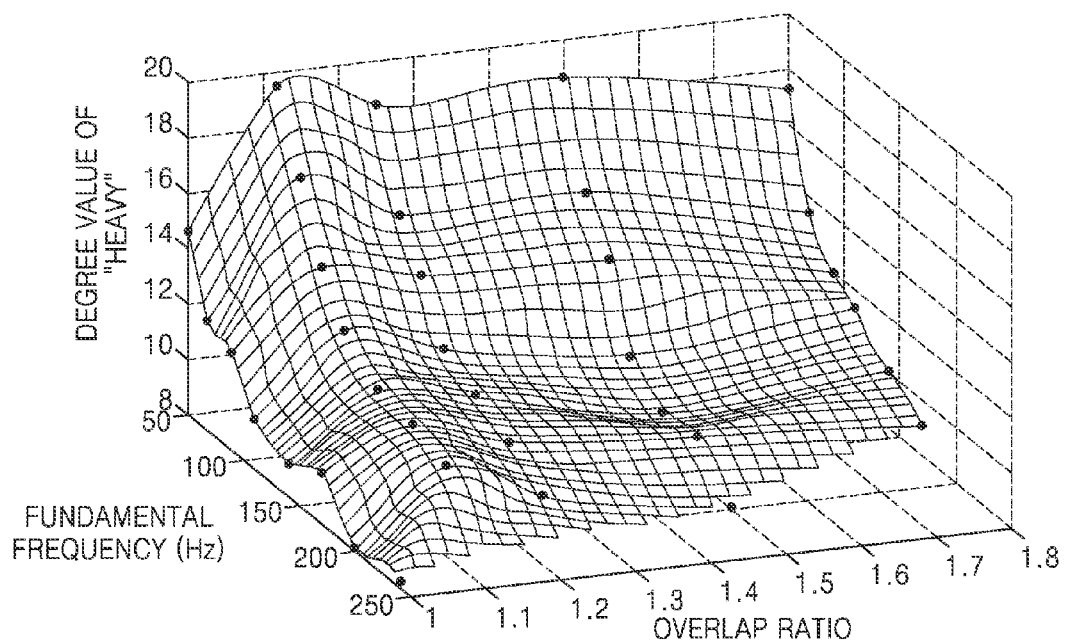
FIG. 6 is a graph representing a degree value of a first adjective versus a fundamental frequency and an overlap ratio according to various embodiments of the present disclosure.

FIG. 6 is a graph representing a degree value of a first adjective versus a fundamental frequency and an overlap ratio according to various embodiments of the present disclosure.

Referring to FIG. 6, a first adjective may be "heavy", and a user may strongly feel a "heavy" sense when a degree value of the first adjective "heavy" is great. Also, the graph representing the degree value of the first adjective "heavy" versus the fundamental frequency and the overlap ratio may be generated by perceptive experiments. For example, the graph representing the degree value of the first adjective "heavy" versus the fundamental frequency and the overlap ratio may be generated by experimentally measuring the degree of the "heavy" sense for the physical property of the vibration.

Figure 7:
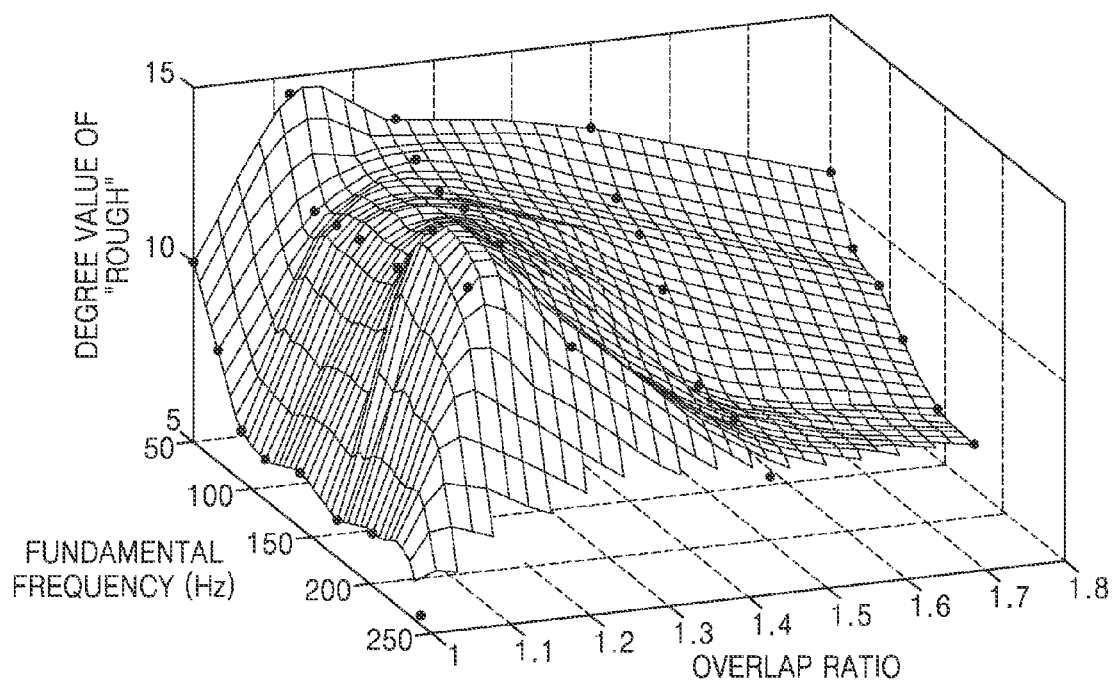
FIG. 7 is a graph representing a degree value of a second adjective versus a fundamental frequency and an overlap ratio according to various embodiments of the present disclosure.

FIG. 7 is a graph representing a degree value of a second adjective versus a fundamental frequency and an overlap ratio according to various embodiments of the present disclosure.

Referring to FIG. 7, a second adjective may be "rough", and a user may strongly feel a "rough" sense when a degree value of the second adjective "rough" is great. Also, the graph representing the degree value of the second adjective "rough" versus the fundamental frequency and the overlap ratio may be generated by perceptive experiments. For example, the graph representing the degree value of the second adjective "rough" versus the fundamental frequency and the overlap ratio may be generated by experimentally measuring the degree of the "rough" sense for the physical property of the vibration.

FIG. 8 is a graph representing a fundamental frequency value versus a degree value of a first adjective and a degree value of a second adjective according to various embodiments of the present disclosure.

Referring to FIG. 8, a first adjective may be "heavy", and a second adjective may be "rough".

Also, the graph of FIG. 8 may be generated based on the graphs of FIGS. 6 and 7. For example, the device 1000 may generate the graph representing the fundamental frequency value versus the degree value of "heavy" and the degree value of "rough" by using the graph of FIG. 6 representing the degree value of "heavy" versus the fundamental frequency and the overlap ratio and the graph of FIG. 7 representing the degree value of "rough" versus the fundamental frequency and the overlap ratio.

Also, when the degree value of "heavy" and the degree value of "rough" are input from the user, the device 1000 may acquire the fundamental frequency value corresponding to the input degree values by using the graph of FIG. 8.

Figure 9:
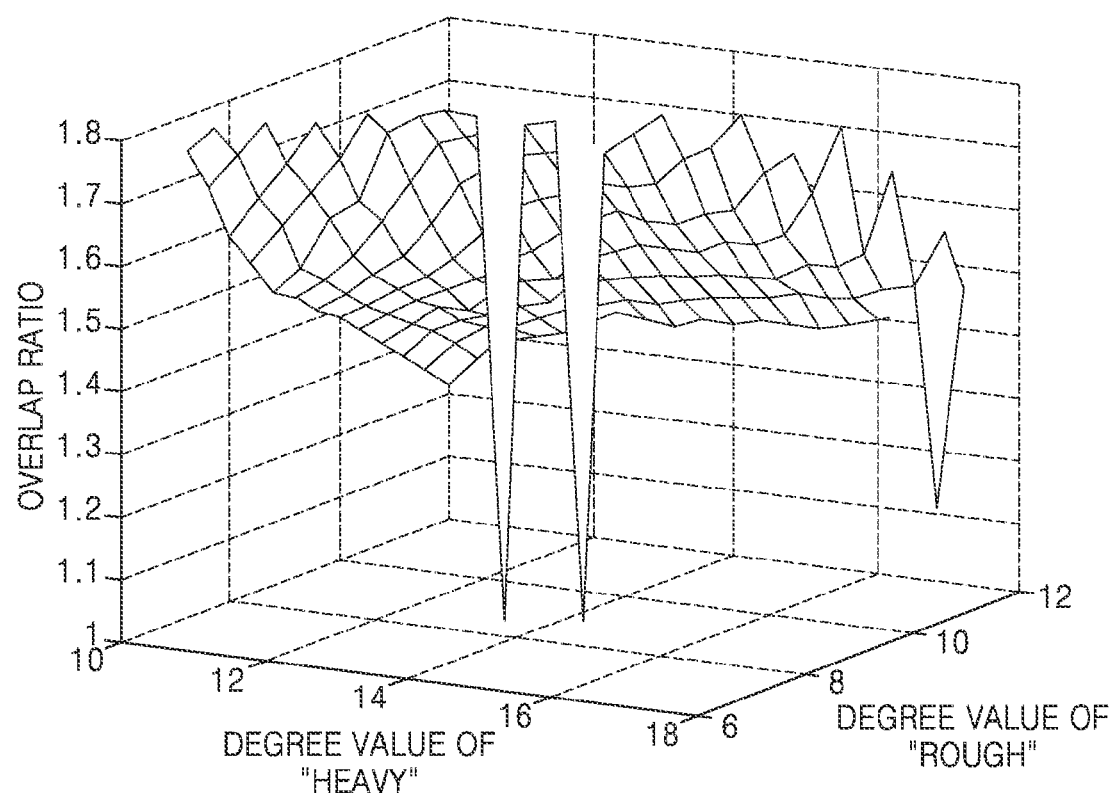
FIG. 9 is a graph representing an overlap ratio value versus a degree value of a first adjective and a degree value of a second adjective according to various embodiments of the present disclosure.

FIG. 9 is a graph representing an overlap ratio value versus a degree value of a first adjective and a degree value of a second adjective according to various embodiments of the present disclosure.

Referring to FIG. 9, a first adjective may be "heavy", and the second adjective may be "rough".

Also, the graph of FIG. 9 may be generated based on the graphs of FIGS. 6 and 7. For example, the device 1000 may generate the graph representing the overlap ratio value versus the degree value of "heavy" and the degree value of "rough" by using the graph of FIG. 6 representing the degree value of "heavy" versus the fundamental frequency and the overlap ratio and the graph of FIG. 7 representing the degree value of "rough" versus the fundamental frequency and the overlap ratio.

Also, when the degree value of "heavy" and the degree value of "rough" are input from the user, the device 1000 may acquire the overlap ratio value corresponding to the input degree values by using the graph of FIG. 9.

Figure 10:
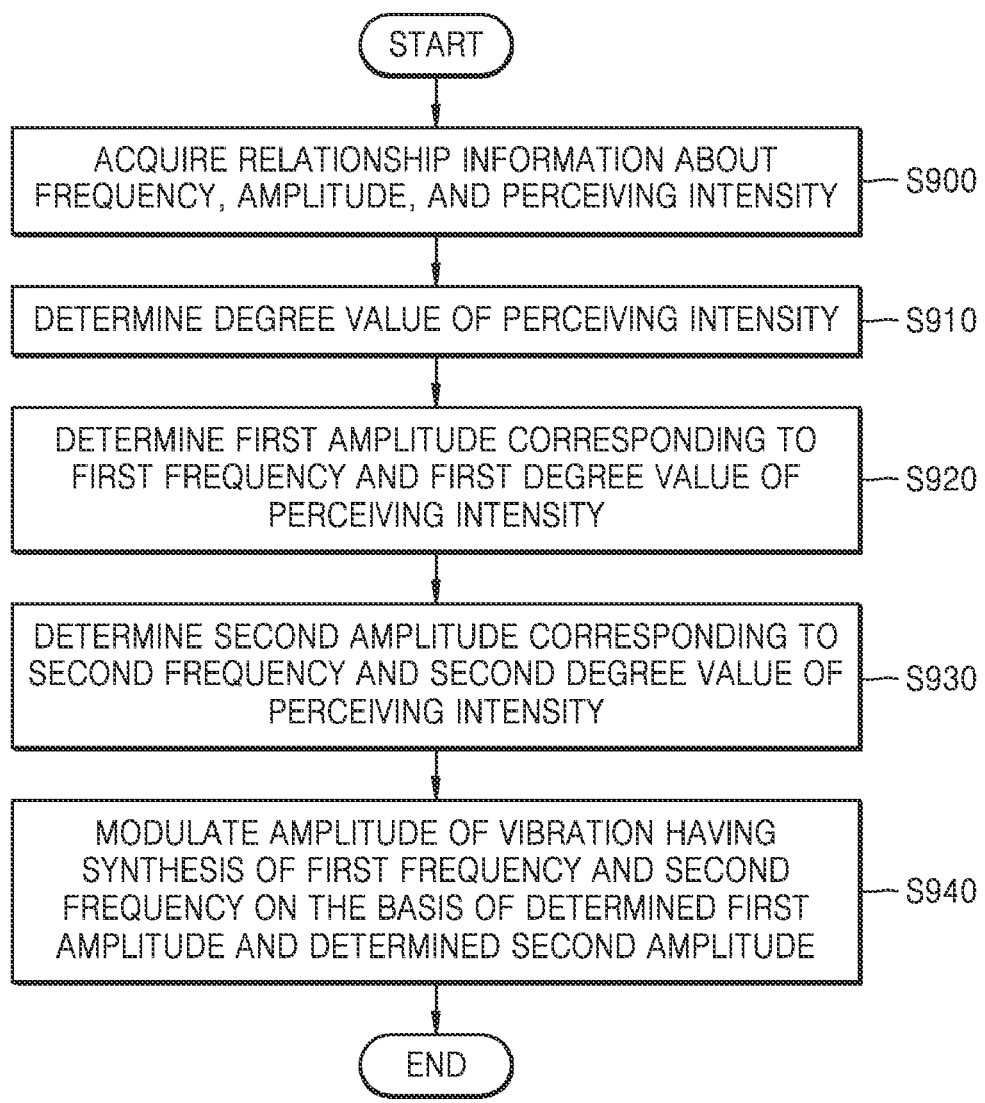
FIG. 10 is a flowchart of a method for generating a vibration by a device based on a degree value of a perceiving intensity according to various embodiments of the present disclosure.

FIG. 10 is a flowchart of a method for generating a vibration by the device 1000 based on a degree value of a perceiving intensity according to various embodiments of the present disclosure.

Referring to FIG. 10, in operation S900, the device 1000 acquires relationship information about the frequency, the amplitude, and the perceiving intensity of the vibration. The relationship information about the frequency, the amplitude, and the perceiving intensity of the vibration may be a graph representing the perceiving intensity versus the frequency and the amplitude of the vibration. Also, for example, a graph of FIG. 11 may be generated by experimentally measuring the perceiving intensity for the physical properties of the vibration.

Also, for example, relationship information about a frequency f, an amplitude φ, and a perceiving intensity P may be expressed by Equations 3 to 5 below.

$$k=225.2-276.7(\log_{10}f)^1+126.2(\log_{10}f)^2-20.3663(\log_{10}f)^3 \quad \text{Equation 3}$$

$$e=3.718-2.311(\log_{10}f)^1-3.8008(\log_{10}f)^2+0.9818(\log_{10}f)^3 \quad \text{Equation 4}$$

$$p=k\varphi^e \quad \text{Equation 5}$$

In operation S910, the device 1000 determines a degree value of the perceiving intensity. The device 1000 may determine the degree value of the perceiving intensity based on a user input. In this case, the device 1000 may determine the degree value of the perceiving intensity according to a user input to a displayed user interface. However, various embodiments of the present disclosure are not limited thereto.

In operation S920, the device 1000 determines a first amplitude corresponding to a first degree value P1 of the perceiving intensity and the first frequency. In operation S930, the device 1000 determines a second amplitude corresponding to a second degree value P2 of the perceiving intensity and the second frequency. In this case, the first degree value of the perceiving intensity and the second degree value of the perceiving intensity may be determined by a predetermined criterion based on Equation 6 below and the degree value of the perceiving intensity determined in operation S910. Also, the first amplitude may be related to the first frequency, and the second amplitude may be related to the second frequency. Also, the first frequency and the second frequency may be the frequencies determined in operation S400.

Also, the device 1000 may determine the first amplitude and the second amplitude by using Equations 3 to 6. In this case, Equation 6 may represent the relationship between the first degree value P1 of the perceiving intensity related to the first frequency and the second degree value P2 of the perceiving intensity related to the second frequency and the degree value P of the perceiving intensity related to both of the first frequency and the second frequency.

$$p=\sqrt{p_1^2+p_2^2} \quad \text{Equation 6}$$

Also, the first degree value P1 of the perceiving intensity related to the first frequency and the second degree value P2 of the perceiving intensity related to the second frequency may be preset by various criterions.

In operation S940, the device 1000 modulates the amplitude of a vibration having a synthesis of the first frequency and the second frequency based on the determined first amplitude and the determined second amplitude. Accordingly, the device 1000 may generate a vibration having the first frequency and the second frequency based on the first amplitude, the second amplitude, the first degree value of the perceiving intensity, and the second degree value of the perceiving intensity.

Also, the device 1000 may generate a first vibration having the first amplitude and a second vibration having the second amplitude. In this case, the device 1000 may generate the first vibration such that the first vibration of the first frequency has the first amplitude and may generate the second vibration such that the second vibration of the second frequency has the second amplitude. Also, the device 1000 may generate the first vibration and the second vibration simultaneously within a predetermined period of time.

Figure 11:
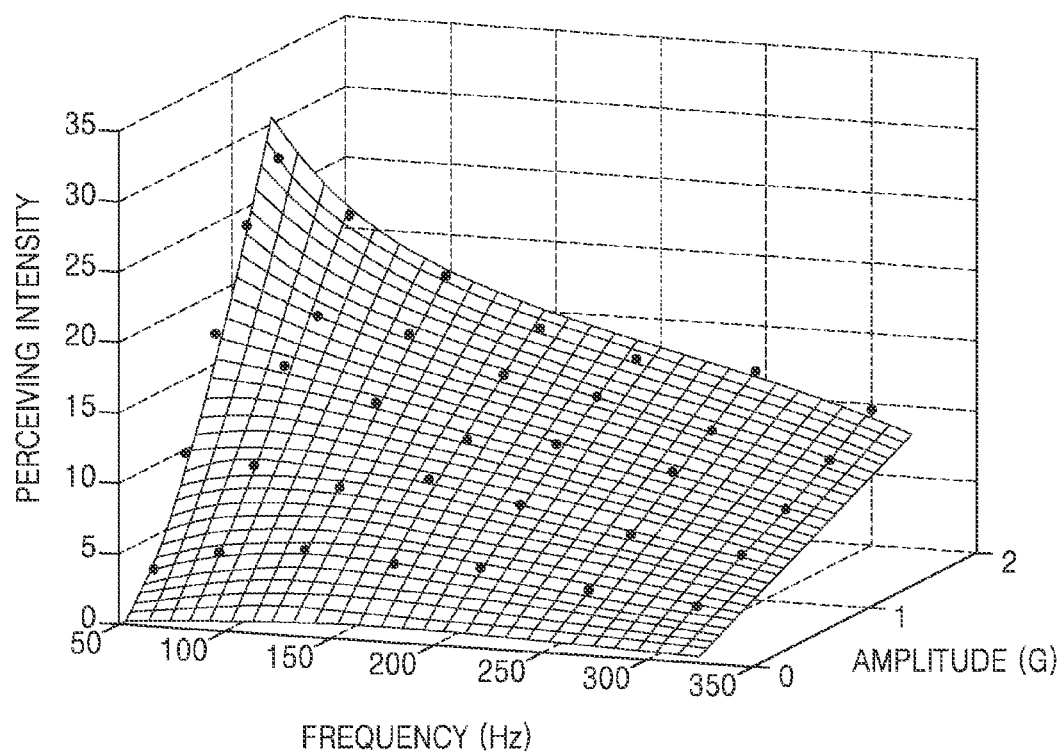
FIG. 11 is a graph representing a perceiving intensity versus a frequency and an amplitude according to various embodiments of the present disclosure.

FIG. 11 is a graph representing a perceiving intensity versus a frequency and an amplitude according to various embodiments of the present disclosure.

Referring to FIG. 11, a graph may be generated by experimentally measuring a perceiving intensity for physical properties of a vibration.

Figure 12:
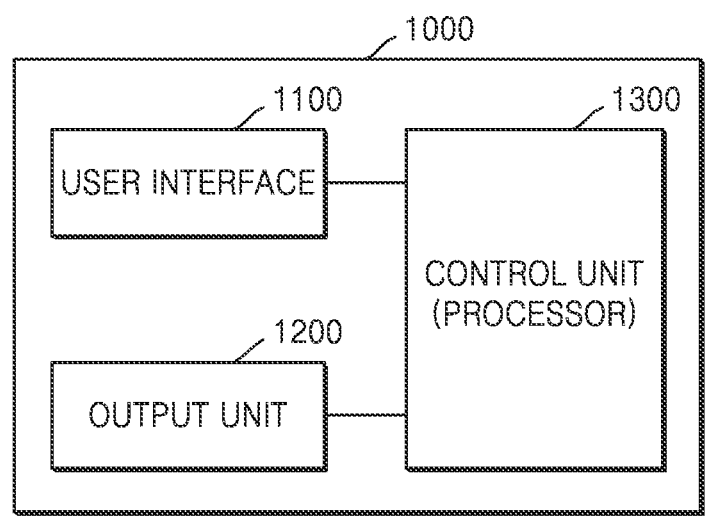
FIGS. 12 and 13 are block diagrams of a device according to various embodiments of the present disclosure.
Figure 13:
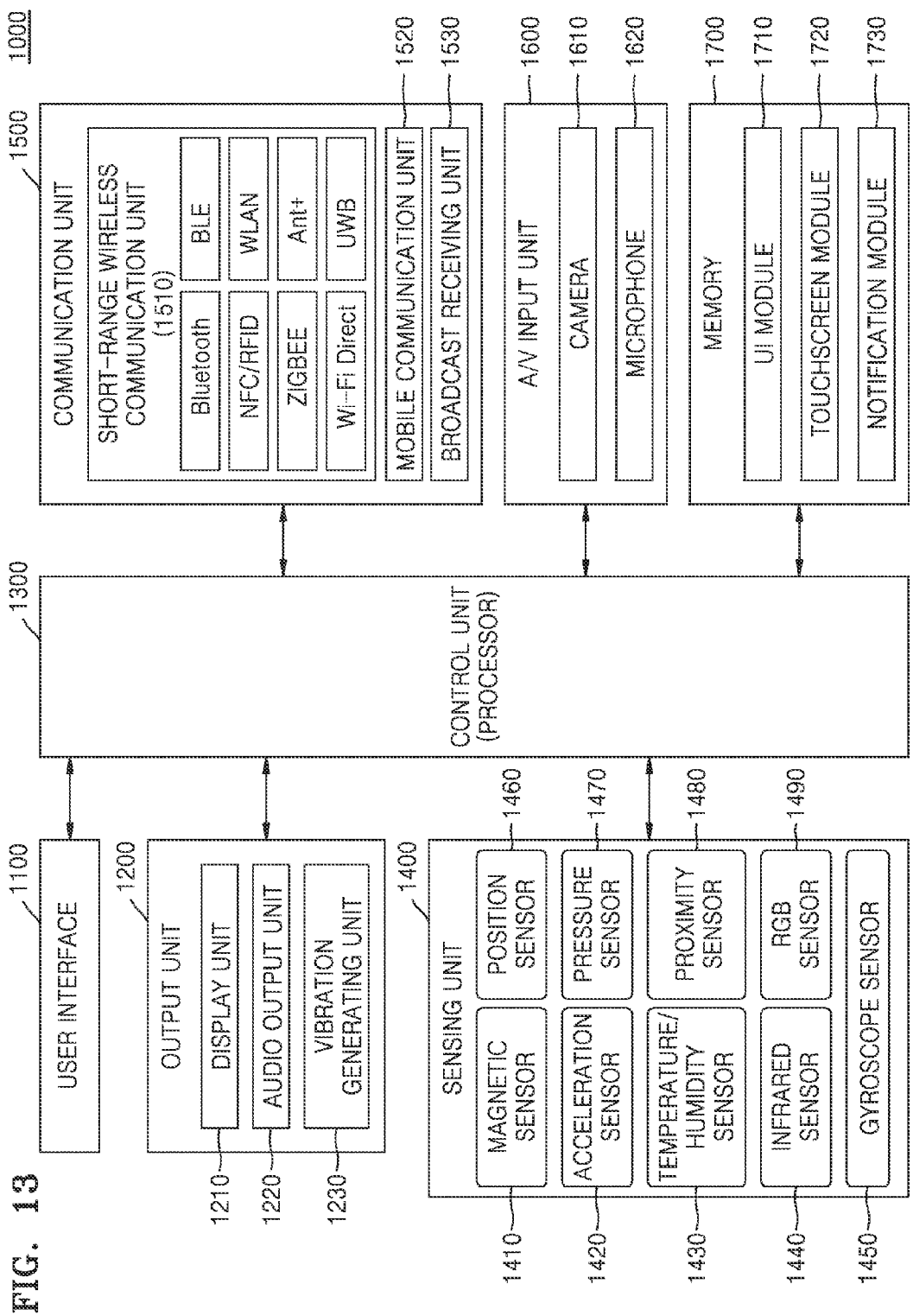

FIGS. 12 and 13 are block diagrams of a device according to various embodiments of the present disclosure.

Referring to FIG. 12, the device 1000 according to various embodiments of the present disclosure may include a user input unit 1100, an output unit 1200, and a control unit 1300. However, not all of the illustrated elements are indispensable elements of the device 1000. The device 1000 may include elements more than the illustrated elements, or may include elements fewer than the illustrated elements.

referring to FIG. 13, the device 1000 may further include a sensing unit 1400, a communication unit 1500, an audio/video (A/V) input unit 1600, and a memory 1700 in addition to the user input unit 1100, the output unit 1200, and the control unit 1300.

The user input unit 1100 refers to a unit through which the user inputs data for controlling the device 1000. For example, the user input unit 1100 may include, but is not limited to, a keypad, a dome switch, a touch pad (e.g., a capacitive overlay type, a resistive overlay type, an infrared beam type, a surface acoustic wave type, an integral strain gauge type, or a piezoelectric type), a jog wheel, and a jog switch.

The user input unit 1100 may receive a user input under the control of the control unit 1300. For example, the user input unit 1000 may receive a user input for inputting the degree value of the first adjective, the degree value of the second adjective, and the degree value of the perceiving intensity.

Under the control of the control unit 1300, the output unit 1200 outputs an audio signal, a video signal, or a vibration signal. For example, the output unit 1200 may include a display unit 1210, an audio output unit 1220, and a vibration generating unit 1230.

Under the control of the control unit 1300, the display unit 1210 displays information processed by the device 1000. The display unit 1210 may display a user interface for receiving an input of values set for vibration generation of the device 1000.

When the display unit 1210 includes a touchscreen with a layer structure of a touch pad, the display unit 1210 may be used as an input device in addition to an output device. The display unit 1210 may include at least one of a liquid crystal display (LCD), a thin film transistor LCD (TFT-LCD), an organic light-emitting diode (OLED) display, a flexible display, a three-dimensional (3D) display, and an electrophoretic display. Also, the device 1000 may include two or more display units 1210 in some embodiments. In this case, the two or more display unit 1210 may be disposed to face each other through a hinge structure.

The audio output unit 1220 outputs audio data received from the communication unit 1500 or stored in the memory 1700. Also, the audio output unit 1220 may output audio signals related to functions (e.g., call signal reception, message reception, and notification) performed in the device 1000. The audio output unit 1220 may include a speaker and a buzzer.

The vibration generating unit 1230 may output a vibration signal under the control of the control unit 1300. The vibration generating unit 1230 may include a vibration motor, but is not limited thereto. The vibration generating unit 1230 may generate a vibration corresponding to an adjective and a degree value of the adjective. For example, the vibration generating unit 1230 may generate a vibration having a first frequency and a second frequency. The vibration generating unit 1230 may generate a vibration according to a first frequency, a first amplitude, a second frequency, and a second amplitude determined by the control unit 1300 that will be described later. Also, for example, the vibration generating unit 1230 may generate a first vibration having the first frequency and a second vibration having the second frequency.

The control unit 1300 controls overall operations of the device 1000. For example, the control unit 1300 may control the user input unit 1100, the output unit 1200, the sensing unit 1400, the communication unit 1500, and the A/V input unit 1600 by executing programs stored in the memory 1700.

In detail, the control unit 1300 may set at least one fundamental frequency and at least one overlap ratio corresponding to an adjective having a predetermined degree value. For example, the control unit 1300 may set a fundamental frequency and an overlap ratio corresponding to an adjective and a degree value of the adjective. Also, for example, the control unit 1300 may set a fundamental frequency and an overlap ratio corresponding to an adjective and a degree value of the adjective. Also, for example, the control unit 1300 may set a fundamental frequency and an overlap ratio corresponding to a plurality of adjectives and degree values of the adjectives. Also, for example, the control unit 1300 may set a plurality of fundamental frequencies and a plurality of overlap ratios corresponding to a plurality of adjectives and degree values of the adjectives. Accordingly, the device 1000 may effectively synthesize various frequencies to embody an adjective having a predetermined degree value as a vibration.

Also, the fundamental frequency and the overlap ratio corresponding to the adjective and the degree value of the adjective may be experimentally determined. For example, a fundamental frequency and an overlap ratio may be experimentally determined to generate a vibration of a "rough" sense having a degree value "10".

Also, the control unit 1300 may set an amplitude variation value of a vibration corresponding to an adjective having a predetermined degree value. For example, a variation value of a vibration may be experimentally determined to generate a vibration of a "rough" sense having a degree value "10". In this case, the variation value of the vibration may be experimentally determined in association with the fundamental frequency and the overlap ratio. Also, the control unit 1300 may set the experimentally-determined variation value of the vibration as a variation value of a vibration corresponding to an adjective having a predetermined degree value.

Also, the control unit 1300 may determine an adjective related to a vibration to be generated and a degree value of the adjective. The control unit 1300 may determine an adjective related to a vibration to be generated and a degree value of the adjective when the device 1000 receives at least one user input for inputting an adjective and a degree value of the adjective. For example, the control unit 1300 may display a predetermined user interface for inputting the adjective related to the vibration to be generated and the degree value of the adjective on the screen of the device 1000, and determine the adjective and the degree value of the adjective based on the user input to the displayed user interface.

Also, the control unit 1300 may determine a degree value of the perceiving intensity related to the vibration to be generated. The control unit 1300 may determine a degree value of the perceiving intensity related to the vibration to be generated by receiving at least one user input for inputting a degree value of the perceiving intensity. For example, the control unit 1300 may display a predetermined user interface for inputting the degree value of the perceiving intensity related to the vibration to be generated on the screen of the device 1000, and determine the degree value of the perceiving intensity based on the user input to the displayed user interface.

Also, the control unit 1300 may generate at least one vibration corresponding to the determined adjective and the determined degree value of determined adjective. The control unit 1300 may determine the fundamental frequency and the overlap ratio corresponding to the adjective and the degree value of the adjective input by the user based on the values set in operation S100, and generate a vibration having the determined fundamental frequency and the determined overlap ratio.

Also, the control unit 1300 may determine an amplitude variation value of the vibration having the determined fundamental frequency and the determined overlap ratio based on the values set in operation S100, and generate a vibration based on the determined amplitude variation value.

Also, the control unit 1300 may modulate an amplitude of the vibration to be generated, based on the determined degree value of the perceiving intensity. In this case, the control unit 1300 may modulate the amplitude of the vibration to be generated, based on all of the determined adjectives, the determined degree value of the determined adjective, and the determined degree value of the perceiving intensity.

Also, for example, the control unit 1300 may generate a vibration having senses of two adjectives by synthesizing two frequencies. In this case, the control unit 1300 may acquire relationship information between a degree value of the first adjective, a degree value of the second adjective, and the fundamental frequency. The control unit 1300 may receive the relationship information between the degree value of the first adjective, the degree value of the second adjective, and the fundamental frequency from an external device (not illustrated) or may directly generate the relationship information. Also, the relationship information between the degree value of the first adjective, the degree value of the second adjective, and the fundamental frequency may be a graph representing a fundamental frequency value versus the degree value of the first adjective and the degree value of the second adjective. For example, the relationship information between the degree value of the first adjective, the degree value of the second adjective, and the fundamental frequency may be a graph representing a fundamental frequency value versus a degree value of an adjective "heavy" and a degree value of an adjective "rough" as illustrated in FIG. 7.

Also, the graph representing the fundamental frequency value versus the degree value of the first adjective and the degree value of the second adjective may be generated by using a graph representing the degree value of the first adjective versus the fundamental frequency and the overlap ratio and a graph representing the degree value of the second adjective versus the fundamental frequency and the overlap ratio. For example, a graph of FIG. 8 may be generated by synthesizing the graphs of FIGS. 6 and 7.

Also, the control unit 1300 may acquire relationship information between a degree value of the first adjective, a degree value of the second adjective, and the overlap ratio. The control unit 1300 may receive the relationship information between the degree value of the first adjective, the degree value of the second adjective, and the overlap ratio from an external device (not illustrated) or may directly generate the relationship information. Also, the relationship information between the degree value of the first adjective, the degree value of the second adjective, and the overlap ratio may be a graph representing an overlap ratio value versus the degree value of the first adjective and the degree value of the second adjective. For example, the relationship information between the degree value of the first adjective, the degree value of the second adjective, and the overlap ratio may be a graph representing an overlap ratio value versus a degree value of an adjective "heavy" and a degree value of an adjective "rough" as illustrated in FIG. 9.

Also, the graph representing the overlap ratio value versus the degree value of the first adjective and the degree value of the second adjective may be generated by using a graph representing the degree value of the first adjective versus the fundamental frequency and the overlap ratio and a graph representing the degree value of the second adjective versus the fundamental frequency and the overlap ratio. For example, the graph of FIG. 9 may be generated by synthesizing the graphs of FIGS. 6 and 7.

Also, the control unit 1300 may determine a first degree value of the first adjective and a second degree value of the second adjective. The control unit 1300 may determine the first degree value of the first adjective and the second degree value of the second adjective based on the user input. In this case, the control unit 1300 may control the display unit 1210 to display a user interface for setting a degree value of an adjective on the screen of the device 1000. Also, the control unit 1300 may determine the first degree value of the first adjective and the second degree value of the second adjective according to a user input to the displayed user interface. For example, the first adjective may be "heavy", and the second adjective may be "rough". In this case, based on the user input, the control unit 1300 may determine the first degree value of the first adjective "heavy" as "15" and determine the second degree value of the second adjective "rough" as "10".

Also, the first degree value of the first adjective and the second degree value of the second adjective determined in operation S220 may be used by the control unit 1300 to generate a vibration of a sense corresponding to the first adjective and the second adjective by controlling the vibration generating unit 1230.

Also, the control unit 1300 may determine a fundamental frequency and an overlap ratio corresponding to the first degree value and the second degree value. The control unit 1300 may determine the fundamental frequency corresponding to the first degree value and the second degree value based on the relationship information between the degree value of the first adjective, the degree value of the second adjective, and the fundamental frequency. For example, the control unit 1300 may acquire the fundamental frequency corresponding to the first degree value and the second degree value by inputting the first degree value and the second degree value to the graph representing the fundamental frequency value versus the degree value of the first adjective and the degree value of the second adjective.

Also, the control unit 1300 may determine the overlap ratio corresponding to the first degree value and the second degree value based on the relationship information between the degree value of the first adjective, the degree value of the second adjective, and the overlap ratio. For example, the control unit 1300 may acquire the overlap ratio corresponding to the first degree value and the second degree value by inputting the first degree value and the second degree value to the graph representing the overlap ratio value versus the degree value of the first adjective and the degree value of the second adjective.

Also, the control unit 1300 generates a vibration based on the fundamental frequency and the overlap ratio corresponding to the first degree value and the second degree value. The control unit 1300 may determine a first frequency and a second frequency based on the relationship of the first frequency and the second frequency to the fundamental frequency and the overlap ratio.

Also, the control unit 1300 may control the vibration generating unit 1230 to generate a vibration having the first frequency and the second frequency.

Also, based on the degree value of the perceiving intensity, the control unit 1300 may determine a first degree value of the perceiving intensity related to the first frequency and a second degree value of the perceiving intensity related to the second frequency.

The control unit 1300 acquires relationship information about the frequency, the amplitude, and the perceiving intensity of the vibration. The relationship information about the frequency, the amplitude, and the perceiving intensity of the vibration may be a graph representing the perceiving intensity versus the frequency and the amplitude of the vibration. Also, for example, the graph of FIG. 11 may be generated by experimentally measuring the perceiving intensity for the physical properties of the vibration.

Also, for example, the relationship information about the frequency f, the amplitude φ, and the perceiving intensity P may be expressed by Equations 3 to 5.

Also, the control unit 1300 determines a degree value of the perceiving intensity. The control unit 1300 may determine the degree value of the perceiving intensity based on the user input. In this case, the control unit 1300 may determine the degree value of the perceiving intensity according to the user input to the displayed user interface. However, various embodiments of the present disclosure are not limited thereto.

Also, the control unit 1300 determines a first amplitude corresponding to the first degree value P1 of the perceiving intensity and the first frequency, and determines a second amplitude corresponding to the second degree value P2 of the perceiving intensity and the second frequency. In this case, the first degree value of the perceiving intensity and the second degree value of the perceiving intensity may be determined by a predetermined criterion based on Equation 6 and the degree value of the perceiving intensity determined in operation S910. Also, the first amplitude may be related to the first frequency, and the second amplitude may be related to the second frequency.

Also, the control unit 1300 may determine the first amplitude and the second amplitude by using Equations 3 to 6. Also, the first degree value P1 of the perceiving intensity related to the first frequency and the second degree value P2 of the perceiving intensity related to the second frequency may be preset by various criterions.

Also, by controlling the vibration generating unit 1230, the control unit 1300 modulates the amplitude of a vibration having a synthesis of the first frequency and the second frequency based on the determined first amplitude and the determined second amplitude. Accordingly, the control unit 1300 may generate a vibration having the first frequency and the second frequency based on the first amplitude, the second amplitude, the first degree value of the perceiving intensity, and the second degree value of the perceiving intensity.

Also, the control unit 1300 may generate a first vibration having the first amplitude and a second vibration having the second amplitude. In this case, the control unit 1300 may generate the first vibration such that the first vibration of the first frequency has the first amplitude and may generate the second vibration such that the second vibration of the second frequency has the second amplitude. Also, the control unit 1300 may generate the first vibration and the second vibration simultaneously within a predetermined period of time.

The sensing unit 1400 may detect a state of the device 1000 or a peripheral state of the device 1000 and transmit the detected information to the control unit 1300. The sensing unit 1400 may include, but is not limited to, at least one of a magnetic sensor 1410, an acceleration sensor 1420, a temperature/humidity sensor 1430, an infrared sensor 1440, a gyroscope sensor 1450, a position sensor (e.g., GPS sensor) 1460, a pressure sensor 1470, a proximity sensor 1480, and a Red, Green, and Blue (RGB) sensor (illuminance sensor) 1490. Since those of ordinary skill in the art may intuitively infer the respective functions of the sensors from the respective names thereof, detailed descriptions thereof will be omitted.

Also, the sensing unit 1400 may include a sensor for sensing a touch input by an input tool and a sensor for sensing a touch input by the user. In this case, the sensor for sensing a touch input by the user may be included in a touchscreen or a touchpad. Also, the sensor for sensing a touch input by the input tool may be disposed under the touchscreen or the touchpad or may be included in the touchscreen or the touchpad.

Under the control of the control unit 1300, the communication unit 1500 receives a variety of information from an external device (not illustrated). The communication unit 1500 may receive relationship information between the degree values of the adjectives and the fundamental frequency, for example, relationship information between the degree value of the first adjective, the degree value of the second adjective, and the fundamental frequency from an external device (not illustrated). Also, the communication unit 1500 may receive relationship information between the degree values of the adjectives and the overlap ratio, for example, relationship information between the degree value of the first adjective, the degree value of the second adjective, and the overlap ratio from an external device (not illustrated).

Also, the communication unit 1500 may include one or more elements for communication between the device 1000 and an external device (not illustrated). For example, the communication unit 1500 may include a short-range wireless communication unit 1510, a mobile communication unit 1520, and a broadcast receiving unit 1530.

The short-range wireless communication unit 1510 may include, but is not limited to, a Bluetooth communication unit, a Bluetooth Low Energy (BLE) communication unit, a near field communication unit, a wireless local area network (WLAN) (Wi-Fi) communication unit, a ZigBee communication unit, an infrared data association (IrDA) communication unit, a Wi-Fi Direct (WFD) communication unit, an ultra wideband (UWB) communication unit, and an Ant+ communication unit.

The mobile communication unit 1520 communicates wireless signals with at least one of a base station, an external terminal, and a server on a mobile communication network. Herein, the wireless signals may include voice call signals, video call signals, or various types of data for transmission and reception of text/multimedia messages.

The broadcast receiving unit 1530 receives broadcast signals and/or broadcast-related information from external devices through broadcast channels. The broadcast channels may include satellite channels and terrestrial channels. In various embodiments of the present disclosure, the device 1000 may not include the broadcast receiving unit 1530.

The A/V input unit 1600 may be used to input audio signals or video signals and may include a camera 1610 and a microphone 1620. The camera 1610 may obtain a video frame such as a still image or a moving image through an image sensor in a video call mode or a photographing mode. The image captured through the image sensor may be processed by the control unit 1300 or a separate image processing unit (not illustrated).

The memory 1700 may store a program for processing and control of the control unit 1300, and may store input/output data.

The memory 1700 may include at least one type of storage medium from among flash memory type, hard disk type, multimedia card micro type, card type memory (e.g., secure digital (SD) and extreme digital (XD) memories), random-access memory (RAM), static RAM (SRAM), read-only memory (ROM), electronically erasable programmable ROM (EEPROM), PROM, magnetic memory, magnetic disk, and optical disk.

The programs stored in the memory 1700 may be classified into a plurality of modules according to their functions and may be classified into, for example, a user interface (UI) module 1710, a touchscreen module 1720, and a notification module 1730.

The UI module 1710 may provide a specialized UI and a graphical UI (GUI) that interlock with the device 1000 for respective applications. The touchscreen module 1720 may sense a touch gesture of the user on a touchscreen and transfer information about the touch gesture to the control unit 1300. According to an embodiment of the present disclosure, the touchscreen module 1720 may detect and analyze a touch code. The touchscreen module 1720 may include separate hardware including a controller.

Various sensors may be provided in or near the touchscreen to sense a proximity touch or a touch to the touchscreen. An example of the sensor for sensing a touch to the touchscreen is a tactile sensor. The tactile sensor refers to a sensor that senses a touch of an object in the degree of a human sense or more. The tactile sensor may sense a variety of information, such as the roughness of a touch surface, the hardness of a touch object, and the temperature of a touch point.

Another example of the sensor for sensing a touch to the touchscreen is a proximity sensor. The proximity sensor refers to a sensor that detects the presence of an object approaching a predetermined detection surface or an object located in the proximity thereof without mechanical contact by using an electromagnetic force or infrared rays. Examples of the proximity sensor may include transmission type photoelectric sensors, direct reflection type photoelectric sensors, mirror reflection type photoelectric sensors, high frequency oscillation type proximity sensors, electrostatic capacity type proximity sensors, magnetic type proximity sensors, and infrared proximity sensors. Examples of the touch gesture of the user may include tap, touch & hold, double tap, drag, panning, flick, drag & drop, and swipe.

The notification module 1730 may generate a signal for notifying the occurrence of an event in the device 1000. Examples of the event occurring in the device 1000 include call signal reception, message reception, key signal input, and schedule notification. The notification module 1730 may output a notification signal of a video signal type through the display unit 1210, output a notification signal of an audio signal type through the audio output unit 1220, and output a notification signal of a vibration signal type through the vibration generating unit 1230.

The various embodiments of the present disclosure may also be implemented in the form of a computer-readable recording medium including instructions executable by a computer, such as a program module executed by a computer. The computer-readable recording medium may be any available medium accessible by computers, examples of which may include a volatile recording medium, a nonvolatile recording medium, a removable recording medium, and an unremovable recording medium. Also, examples of the computer-readable recording medium may include a computer storage medium and a communication medium. Examples of the computer storage medium may include a volatile storage medium, a nonvolatile storage medium, a removable storage medium, and an unremovable storage medium that are implemented by any method or technology for storing information such as computer-readable instructions, data structures, program modules, or other data. Examples of the communication medium may include any information transmission medium including computer-readable instructions, data structures, program modules, other data of modulated data signals, or other transmission mechanisms.

The foregoing is illustrative of various embodiments of the present disclosure and is not to be construed as limiting thereof. Although the various embodiments of the present disclosure have been described above, those of ordinary skill in the art will readily appreciate that various modifications are possible in the various embodiments of the present disclosure without materially departing from the concepts and features of the various embodiments of the present disclosure. Therefore, it is to be understood that the embodiment of the present disclosure described above should be considered in a descriptive sense only and not for purposes of limitation. For example, elements described as being combined may also be implemented in a distributed manner, and elements described as being distributed may also be implemented in a combined manner.

Therefore, the scope of the present disclosure is defined not by the detailed description of the various embodiments but by the appended claims, and all modifications or differences within the scope should be construed as being included in the present disclosure.

It should be understood that the various embodiments of the present disclosure described herein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for generating a vibration by a device based on an adjective word, the method comprising:
setting, by at least one processor, for each of a plurality of adjective words, at least one fundamental frequency and a degree value of senses corresponding to an adjective word, the adjective words indicating senses provided to a user through the vibration of the device, and the degree value of senses indicating a degree of the senses provided to the user through the vibration of the device;
displaying at least one adjective words and the degree value of senses corresponding to the adjective words;
receiving at least one user input for selecting an adjective word among the displayed adjective words; and
generating, by the device, at least one vibration having the at least one fundamental frequency, the at least one fundamental frequency being based on the selected adjective word and the degree value of senses corresponding to the selected adjective word, according to the setting,
wherein a certain adjective word comprises a first adjective word and a second adjective word, and
wherein the setting of the at least one fundamental frequency comprises:
setting at least one overlap ratio;

acquiring relationship information between a degree value of the first adjective word, a degree value of the second adjective word, and the fundamental frequency; and acquiring relationship information between the degree value of the first adjective word, the degree value of the second adjective word, and the overlap ratio.

2. The method of claim 1, further comprising:

receiving a user input for inputting a degree value of a perceived intensity; and modulating an amplitude of the at least one vibration based on the input degree value of the perceived intensity.

3. The method of claim 1, wherein the receiving of the at least one user input comprises receiving a first degree value of the first adjective word and a second degree value of the second adjective word that are input by the at least one user input, and wherein the generating of the at least one vibration comprises:

determining a fundamental frequency and an overlap ratio corresponding to the first degree value and the second degree value based on the acquired relationship information; and generating the at least one vibration based on the determined fundamental frequency and the determined overlap ratio.

4. The method of claim 1, wherein the fundamental frequency is a smallest one of a first frequency and a second frequency, and wherein the overlap ratio is a value obtained by dividing a greatest one of the first frequency and the second frequency by the fundamental frequency.

5. The method of claim 1, wherein the relationship information between the degree value of the first adjective word, the degree value of the second adjective word, and the fundamental frequency is acquired from relationship information between the degree value of the first adjective word, the fundamental frequency, and the overlap ratio, and relationship information between the degree value of the second adjective word, the fundamental frequency, and the overlap ratio.

6. The method of claim 1, wherein the relationship information between the degree value of the first adjective word, the degree value of the second adjective word, and the overlap ratio is acquired from relationship information between the degree value of the first adjective word, the fundamental frequency, and the overlap ratio, and relationship information between the degree value of the second adjective word, the fundamental frequency, and the overlap ratio.

7. The method of claim 2, wherein the modulating of the amplitude of the at least one vibration comprises:

acquiring relationship information about a frequency, an amplitude, and a perceived intensity; and modulating the amplitude of the at least one vibration based on the acquired relationship information about the frequency, the amplitude, and the perceiving intensity.

8. A device for generating a vibration based on an adjective word, the device comprising:

at least one processor configured to set for each of a plurality of adjective words, at least one fundamental frequency and a degree value of senses corresponding to an adjective word, the adjective words indicating senses provided to a user through the vibration of the device, and the degree value of senses indicating a degree of the senses provided to the user through the vibration of the device;

control to display at least one adjective words and the degree value of senses corresponding to the adjective words;

a user input unit configured to receive at least one user input for selecting an adjective word among the displayed adjective words; and a vibration generator configured to generate at least one vibration having the at least one fundamental frequency, the at least one fundamental frequency being based on the selected adjective word and the degree value of senses corresponding to the selected adjective word, according to the setting, wherein a certain adjective word comprises a first adjective word and a second adjective word, and wherein the at least one processor is further configured to:
set at least one overlap ratio, acquire relationship information between a degree value of the first adjective word, a degree value of the second adjective word, and the fundamental frequency, and acquire relationship information between the degree value of the first adjective word, the degree value of the second adjective word, and the overlap ratio.

9. The device of claim 8, wherein the user input unit is further configured to receive a user input for inputting a degree value of a perceived intensity, and wherein the at least one processor is further configured to modulate an amplitude of the at least one vibration based on the input degree value of the perceived intensity.

10. The device of claim 8, wherein the user input unit is further configured to receive a first degree value of the first adjective word and a second degree value of the second adjective word, the first and second adjective words being input by the at least one user input, wherein the at least one processor is further configured to determine a fundamental frequency and an overlap ratio corresponding to the first degree value and the second degree value based on the acquired relationship information, and wherein the vibration generator is further configured to generate the at least one vibration based on the determined fundamental frequency and the determined overlap ratio.

11. The device of claim 8, wherein the fundamental frequency is a smallest one of a first frequency and a second frequency, and wherein the overlap ratio is a value obtained by dividing a greatest one of the first frequency and the second frequency by the fundamental frequency.

12. The device of claim 8, wherein the relationship information between the degree value of the first adjective word, the degree value of the second adjective word, and the fundamental frequency is acquired from relationship information between the degree value of the first adjective word, the fundamental frequency, and the overlap ratio, and relationship information between the degree value of the second adjective word, the fundamental frequency, and the overlap ratio.

13. The device of claim 8, wherein the relationship information between the degree value of the first adjective word, the degree value of the second adjective word, and the overlap ratio is acquired from relationship information between the degree value of the first adjective word, the fundamental frequency, and the overlap ratio, and relationship information between the degree value of the second adjective word, the fundamental frequency, and the overlap ratio.

14. The device of claim 9, wherein the at least one processor is further configured to:

acquire relationship information about a frequency, an amplitude, and a perceiving intensity, and modulate the amplitude of the at least one vibration based on the acquired relationship information about the frequency, the amplitude, and the perceiving intensity.

15. A non-transitory computer-readable recording medium that stores one or more programs including instructions that, when executed by a computer, causes at least one processor to perform a method for generating a vibration by a device based on an adjective word, the method comprising:

setting, by the at least one processor, for each of a plurality of adjective words, at least one fundamental frequency and a degree value of senses corresponding to an adjective word, the adjective words indicating senses provided to a user through the vibration of the device, and the degree value of senses indicating a degree of the senses provided to the user through the vibration of the device;

displaying at least one adjective words and the degree value of senses corresponding to the adjective words;

receiving at least one user input for selecting an adjective word among the displayed adjective words; and generating, by the device, at least one vibration having the at least one fundamental frequency, the at least one fundamental frequency being based on the selected adjective word and the degree value of senses corresponding to the selected adjective word, according to the setting, wherein a certain adjective word comprises a first adjective word and a second adjective word, and wherein the setting of the at least one fundamental frequency comprises: setting at least one overlap ratio;

acquiring relationship information between a degree value of the first adjective word, a degree value of the second adjective word, and the fundamental frequency; and acquiring relationship information between the degree value of the first adjective word, the degree value of the second adjective word, and the overlap ratio.

* * * * *